United States Patent
Meng et al.

(10) Patent No.: US 10,908,343 B2
(45) Date of Patent: Feb. 2, 2021

(54) LIGHT SOURCE ASSEMBLY AND DISPLAY DEVICE

(71) Applicant: BOE TECHNOLOGY GROUP CO., LTD., Beijing (CN)

(72) Inventors: Xianqin Meng, Beijing (CN); Xue Dong, Beijing (CN); Wei Wang, Beijing (CN); Xiaochuan Chen, Beijing (CN); Yafeng Yang, Beijing (CN); Jifeng Tan, Beijing (CN); Xiandong Meng, Beijing (CN); Jian Gao, Beijing (CN); Pengxia Liang, Beijing (CN); Ming Zhu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 111 days.

(21) Appl. No.: 15/756,823

(22) PCT Filed: Sep. 13, 2017

(86) PCT No.: PCT/CN2017/101563
§ 371 (c)(1),
(2) Date: Mar. 1, 2018

(87) PCT Pub. No.: WO2018/166154
PCT Pub. Date: Sep. 20, 2018

(65) Prior Publication Data
US 2019/0056548 A1 Feb. 21, 2019

(30) Foreign Application Priority Data
Mar. 17, 2017 (CN) .......................... 2017 1 0160283

(51) Int. Cl.
*F21V 8/00* (2006.01)
*G02B 6/02* (2006.01)
(Continued)

(52) U.S. Cl.
CPC ........... *G02B 6/0036* (2013.01); *G02B 6/005* (2013.01); *G02B 6/0058* (2013.01); *G02B 6/0038* (2013.01); *G02B 6/0065* (2013.01)

(58) Field of Classification Search
None
See application file for complete search history.

(56) References Cited

U.S. PATENT DOCUMENTS

| | | | | |
|---|---|---|---|---|
| 8,412,007 B2 * | 4/2013 | Lee | .......................... | G02B 6/34 385/131 |
| 2004/0208466 A1 * | 10/2004 | Mossberg | .............. | G02B 5/203 385/129 |

(Continued)

FOREIGN PATENT DOCUMENTS

| | | | | |
|---|---|---|---|---|
| CN | 102588845 A * | 7/2012 | ................ | F21S 8/00 |
| CN | 102588845 A | 7/2012 | | |

(Continued)

OTHER PUBLICATIONS

Office Action for International Application No. PCT/CN2017/101563 dated Dec. 20, 2017.

*Primary Examiner* — Edward J Glick
*Assistant Examiner* — Anthony G Quash
(74) *Attorney, Agent, or Firm* — Arent Fox LLP; Michael Fainberg

(57) ABSTRACT

This disclosure provides a light source assembly and a display device, and the light source assembly includes: a first substrate and a second substrate arranged opposite to each other; a waveguide layer arranged between the first substrate and the second substrate; and a side-incident collimated light source arranged on a side of the waveguide layer, wherein the refractive index of the waveguide layer is higher than the refractive index of the first substrate, and the refractive index of the second substrate respectively; and light of the side-incident collimated light source is incident onto the side of (Continued)

the waveguide layer at a preset angle, and the incident light is totally reflected at the interference between the first substrate and the waveguide layer.

17 Claims, 4 Drawing Sheets

(51) Int. Cl.
*G02B 6/293* (2006.01)
*G02F 1/13357* (2006.01)

(56) References Cited

U.S. PATENT DOCUMENTS

| | | | |
|---|---|---|---|
| 2011/0148603 A1* | 6/2011 | Denny | E21B 17/006 340/10.42 |
| 2015/0253486 A1* | 9/2015 | Verger | B32B 17/10036 362/606 |
| 2016/0091775 A1* | 3/2016 | Gibson | G02B 6/0035 349/186 |
| 2016/0265749 A1 | 9/2016 | Inada | |
| 2016/0291405 A1* | 10/2016 | Frisken | G02F 1/133504 |
| 2016/0349438 A1 | 12/2016 | Ma et al. | |
| 2018/0188439 A1* | 7/2018 | Kim | G02B 6/0061 |
| 2019/0310456 A1* | 10/2019 | Meng | G02B 5/1866 |

FOREIGN PATENT DOCUMENTS

| | | | | |
|---|---|---|---|---|
| CN | 203786320 U | | 8/2014 | |
| CN | 104896366 A | | 9/2015 | |
| CN | 205227050 U | | 5/2016 | |
| CN | 106292052 A | * | 1/2017 | ....... G02F 1/134309 |
| CN | 106647042 A | | 5/2017 | |
| JP | 10161123 A | | 6/1998 | |

* cited by examiner

US 10,908,343 B2

1

LIGHT SOURCE ASSEMBLY AND DISPLAY DEVICE

This application is a US National Stage of International Application No. PCT/CN2017/101563, filed on Sep. 13, 2017, designating the United States, and claiming the benefit of Chinese Patent Application No. 201710160283.X, filed with the Chinese Patent Office on Mar. 17, 2017 and entitled "A light source assembly and a display device", which is hereby incorporated by reference in its entirety.

FIELD

This disclosure relates to the field of display technologies, and particularly to a light source assembly and a display device.

BACKGROUND

As the display technologies are advancing constantly, various display devices have emerged all the time, and when there is a poor display effect of a display device, a front light source or a backlight source can be added to assist the display device in displaying. The backlight source refers to a light source configured to illuminate from a side of the display device or behind the display device to thereby improve the illuminance in a low-level light source environment, and the brightness on a computer monitor, a liquid crystal screen, etc., so as to improve the display effect. The front light source is a light source configured to guide light uniformly on an electronic ink screen or a liquid crystal screen from the top to the bottom without illuminating human eyes directly to thereby improve the display effect.

However, since there are light exiting from both sides of the existing backlight source and front light source, the efficiency of the light exiting is degraded, and the display effect of the display device is deteriorated.

SUMMARY

An embodiment of this disclosure provides a light source assembly including: a first substrate and a second substrate arranged opposite to each other; a waveguide layer arranged between the first substrate and the second substrate; and a side-incident collimated light source arranged on a side of the waveguide layer, where:

the refractive index of the waveguide layer is higher than the refractive index of the first substrate, and the refractive index of the second substrate respectively; and light of the side-incident collimated light source is incident onto the side of the waveguide layer at a preset angle, and the incident light is totally reflected at the interference between the first substrate and the waveguide layer.

In a possible implementation, in the light source assembly above according to the embodiment of this disclosure, the refractive index of the second substrate is higher than the refractive index of the first substrate.

In a possible implementation, in the light source assembly above according to the embodiment of this disclosure, the refractive index of the first substrate is equal to the refractive index of the second substrate, and the light source assembly further includes a grating coupling structure arranged between the waveguide layer and the first substrate, where:

the grating coupling structure includes a plurality of grating bars arranged at an interval, and grating gaps

2 between adjacent two of the grating bars, where the refractive of a grating bar is higher than the refractive index of the first substrate; and the first substrate overlies the grating gaps.

In a possible implementation, in the light source assembly above according to the embodiment of this disclosure, the material of the grating coupling structure is the same as that of the waveguide layer.

In a possible implementation, in the light source assembly above according to the embodiment of this disclosure, the grating coupling structure and the waveguide layer are formed in an integral structure.

In a possible implementation, in the light source assembly above according to the embodiment of this disclosure, the grating periodicity of the grating coupling structure is more than 1000 nm, and the duty ratio thereof ranges from 0.1 to 0.9.

In a possible implementation, in the light source assembly above according to the embodiment of this disclosure, the thickness of the grating coupling structure ranges from 100 nm to 1.5 µm.

In a possible implementation, in the light source assembly above according to the embodiment of this disclosure, the material of the waveguide layer includes at least one of resin, glass, ITO, or $Si_3N_4$.

In a possible implementation, in the light source assembly above according to the embodiment of this disclosure, the thickness of the wave guiding layer ranges from 100 nm to 100 µm.

In a possible implementation, in the light source assembly above according to the embodiment of this disclosure, light from the collimated light source is light into which monochromatic light emitted from at least three types of monochromatic laser chips is mixed; or the light from the collimated light source is light into which monochromatic light emitted from at least three types of monochromatic light-emitting diode chips is mixed after a collimating structure; or the light from the collimated light source is white light, emitted by a white light-emitting diode chip, which is collimated by a collimating structure; or the light from the collimated light source is light emitted by a cold cathode fluorescent lamp bar and collimated by a collimating structure.

Correspondingly an embodiment of this disclosure further provides a display device including a display panel, and a front light source located at the light exiting side of the display panel, where the front light source is the light source assembly according to any one of the embodiments of this disclosure; and the second substrate of the light source assembly is located on the side thereof proximate to the display panel.

Correspondingly an embodiment of this disclosure further provides a display device including a liquid crystal display panel, and a backlight source configured to provide a light source for the liquid crystal display panel, where the backlight source is the light source assembly according to any one of the embodiments of this disclosure; and the second substrate of the light source assembly is located on the side thereof proximate to the liquid crystal display panel.

DETAILED DESCRIPTION OF THE EMBODIMENTS

Figure 1:
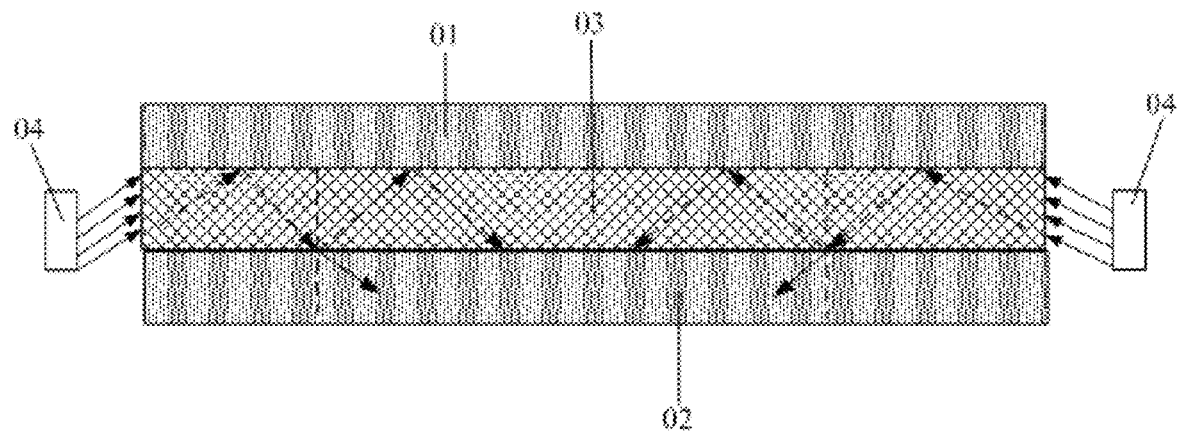
FIG. 1 is a first schematic structural diagram of a light source assembly according to an embodiment of this disclosure.

Particular implementations of a display device according to an embodiment of this disclosure will be described below in details with reference to the drawings.

The shapes and sizes of respective components in the drawings are not intended to reflect any real proportion, but merely intended to illustrate this disclosure.

Figure 2:
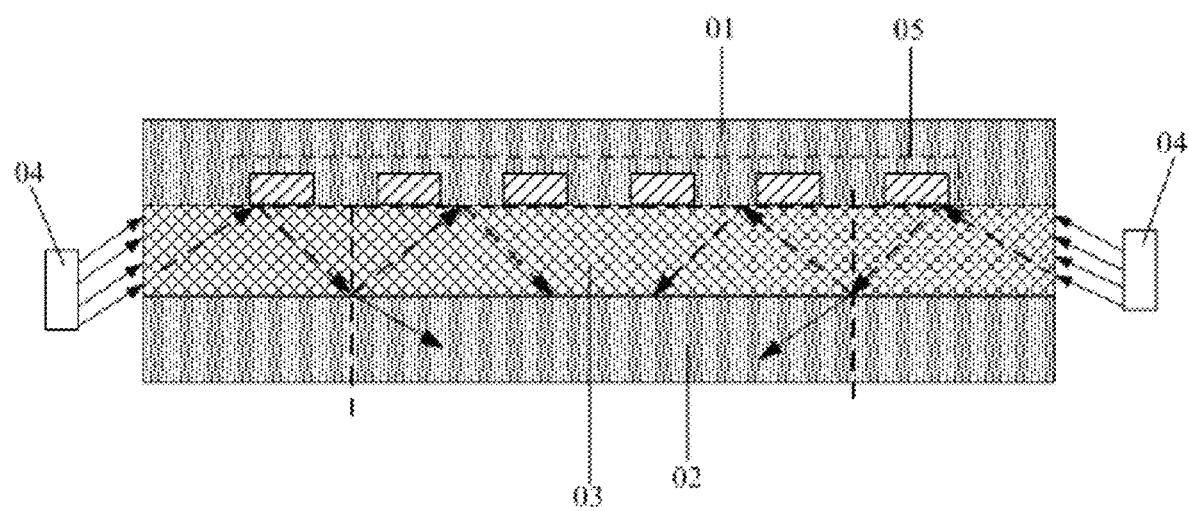
FIG. 2 is a second schematic structural diagram of a light source assembly according to an embodiment of this disclosure.

Particularly an embodiment of this disclosure provides a light source assembly as illustrated in FIG. 1 and FIG. 2 including: a first substrate 01 and a second substrate 02 arranged opposite to each other; a waveguide layer 03 arranged between the first substrate 01 and the second substrate 02; and a side-incident collimated light source 04 arranged on a side of the waveguide layer 03 (the side-incident collimated light source 04 are arranged on both sides of the waveguide layer 03 as illustrated in FIG. 1, for example), where:

the refractive index of the waveguide layer 03 is higher than the refractive index of the first substrate 01, and the refractive index of the second substrate 02 respectively; and light of the side-incident collimated light source 04 is incident onto the side of the waveguide layer 03 at a preset angle, and the incident light is only totally reflected at the interference between the first substrate 01 and the waveguide layer 03.

The light source assembly above according to the embodiment of this disclosure includes: the first substrate and the second substrate arranged opposite to each other; the waveguide layer arranged between the first substrate and the second substrate; and the side-incident collimated light source arranged on the side of the waveguide layer, where the refractive index of the waveguide layer is higher than the refractive index of the first substrate, and the refractive index of the second substrate respectively; and the light of the side-incident collimated light source is incident onto the side of the waveguide layer at a preset angle, and the incident light is only totally reflected at the interference between the first substrate and the waveguide layer. In the embodiment of this disclosure, the light of the side-incident collimated light source can be reflected totally at the interface between the waveguide layer and the first substrate under the principle of total reflection, and can be refracted at the interface between the waveguide layer and the second substrate, that is, the light is radiated from the surface of the second substrate, thus improving the efficiency of the light exiting from the single side of the light source assembly.

As can be apparent, the side-incident collimated light source 04 can be arranged on the side of the waveguide layer 03 in the thickness direction.

In a particular implementation, in the light source assembly above according to the embodiment of this disclosure, the side-incident collimated light source can be arranged on one side of the waveguide layer, or can be arranged on both sides of the waveguide layer, although the embodiment of this discourse will not be limited thereto.

Preferably in a particular implementation, in the light source assembly above according to the embodiment of this disclosure, the side-incident collimated light source is arranged on both sides of the waveguide layer so that the light incident onto the waveguide layer can be enhanced to thereby satisfy a demand for light exiting uniformly on a large-area display device.

In a particular implementation, in the light source assembly above according to the embodiment of this disclosure, light from the collimated light source can be light into which monochromatic light emitted from at least three types of monochromatic laser chips is mixed, and for example, light emitted from semiconductor laser chips in three colors of red (R), green (G), and blue (B) is mixed into the light of the collimated light source. Alternatively the light from the collimated light source can be light into which monochromatic light emitted from at least three types of monochromatic Light-Emitting Diode (LED) chips is mixed after a collimating structure, and for example, light emitted from LED chips in three colors of R, G and B is collimated and mixed into the light of the collimated light source. Alternatively the collimated light source can emit light, emitted by a white LED chip which is collimated by a collimating structure, and for example, white light emitted by the white LED chip is collimated by a collimating structure to form the light of the collimated light source. Alternatively the light from the collimated light source is light emitted from a Cold Cathode Fluorescent Lamp (CCFL) bar and collimated by a collimating structure. The collimated light source will not be limited to the types above.

Moreover in a particular implementation, in the light source assembly above according to the embodiment of this disclosure, in order to enable the light of the collimated light source to be incident in effect onto the side of the waveguide layer, and propagated therein, the collimated light source in the light source assembly above according to the embodiment of this disclosure generally matches in width with the side of the waveguide layer, and particularly laser chips or LED chip bars with the same width as the side of the waveguide layer can be applied, or some expanding structure can be added before sparse laser chips or LED chip bars.

As well known, the principle of total reflection of light refers to such a phenomenon that when light is incident onto an optically thinner medium from an optically denser medium at an incidence angle larger than some angle (a critical angle), refracted light disappears completely, and only reflected beams remain. In this disclosure, the light exits from the single side of the light source assembly under the principle of total reflection, that is, the refractive indexes of the first substrate, the second substrate, and the waveguide layer are preset, and the light of the side-incident collimated light source is arranged to be incident onto the side(s) of the waveguide layer at a preset angle, so that the incident light is totally reflected only at the interface between the waveguide layer and the first substrate, and retracted at the interface between the waveguide layer and the second substrate, so the light an exit the single side of the light source assembly, and a demand for light exiting uniformly in a large area can be satisfied.

The principle under which the light exits from the single side of the light source assembly above according to the embodiment of this disclosure under the principle of total reflection will be described below in details with reference to two embodiments thereof.

First Embodiment

In a particular implementation, in the light source assembly above according to the embodiment of this disclosure, as illustrated in FIG. 2, the refractive index of the first substrate 01 is equal to the refractive index of the second substrate 02, and the light source assembly further includes a grating coupling structure 05 arranged between the waveguide layer 03 and the first substrate 01.

In a particular implementation, in the light source assembly above according to the embodiment of this disclosure, since the refractive index of the first substrate is equal to the refractive index of the second substrate, when the side-incident collimated light source is incident onto the waveguide layer at an angle larger than the critical angle, there is a waveguide mode in which the incident light is totally reflected at both the boundary of the first substrate, and the boundary of the second substrate. However, when the grating coupling structure is arranged between the waveguide layer and the first substrate, the waveguide mode at the boundary of the first substrate is broken, that is, the grating coupling structure is arranged so that the light is diffracted at the interface between the waveguide layer and the first substrate; and when the diffracted light reaches the interface between the waveguide layer and the second substrate at a diffraction angle of m-th order (m=0, ±1, ±2, . . . ), not all diffraction angles of the m order beams are larger than the critical angle, so that not all the light illuminating the interface between the waveguide layer and the second substrate can satisfy the condition of total reflection, so the diffracted light is refracted out of the boundary of the second substrate, and in this way, the light can exit from the single side of the light source assembly.

In a particular implementation, in the light source assembly above according to the embodiment of this disclosure, as illustrated in FIG. 2, each grating coupling structure 05 includes a plurality of grating bars arranged at an interval, and grating gaps between two adjacent grating bars, where the refractive of a grating bar is higher than the refractive index of the first substrate 01; and the first substrate 01 overlies the grating gaps.

Figure 3:
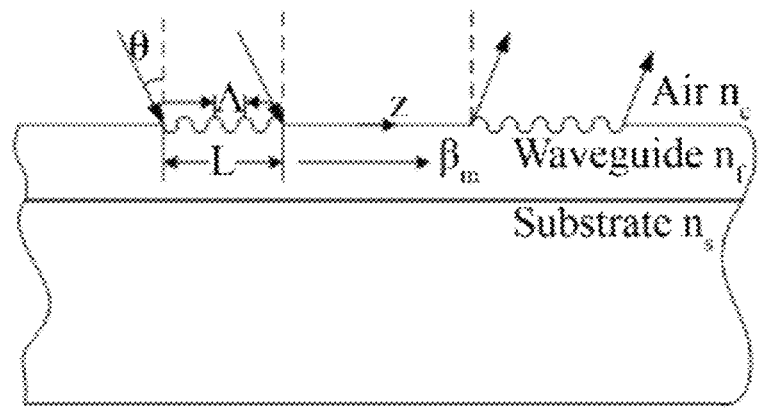
FIG. 3 is a schematic principle diagram illustrating coupling of an optical waveguide in the prior art.

In optical communication and integrated optics, an optical waveguide is a common elementary device. In order to couple in effect a light beam into or out of the waveguide, a grating coupling structure is commonly applied. As illustrated in FIG. 3, when an incident light beam or an exiting light beam satisfies a phase matching relationship defined in the equation of $\beta_q=\beta_m$ qK (q=0, ±1, ±2, . . . ), the incident light can excite guided modes with m orders in the waveguide, or guided modes with m orders can be coupled out of the waveguide in a given direction. In the equation above, $\beta_m$ is a propagation constant $\beta_m=k_0N_m$ in the m-th order guided mode, $N_m$ is a valid refractive index in the m-th order guided mode, K is a grating vector, $K=2\pi/\Lambda$, and $\Lambda$ is a grating periodicity.

In a grating coupling structure, a grating periodicity is composed of a grating bar and an adjacent grating gap.

If the angle between a wave vector direction of the incident light (or the exiting light), and the vertical direction is θ, then the phase matching relationship above may be further represented as $k_0n_c \sin \theta_i=k_0N_m$ q2π/Λ (q=0, ±1, ±2, . . . ).

If the waveguide layer is a transparent medium, then input-output coupling may be further made on one side of the waveguide layer, and at this time, the phase matching relationship may be represented as $k_0n_c \sin \theta_i=k_0N_m$ q2π/Λ (q=0, ±1, ±2, . . . ).

Hereupon, in a particular implementation, in the light source assembly above according to the embodiment of this disclosure, the grating coupling structure arranged between the waveguide layer and the first substrate is used to select beams in a given color (at a light wavelength λ) among beams propagated in the waveguide layer to exit in a given direction (at an angle θ from the normal to the surface of the waveguide layer).

In a particular implementation, in the light source assembly above according to the embodiment of this disclosure, the wavelength λ of the light, with a controllable light direction, coupled out of the waveguide layer by the grating coupling structure in the light source assembly above according to the embodiments of this disclosure, and the grating periodicity Λ of the grating coupling structure satisfy the equation of:

$$n^*\Lambda(\sin \theta_i + \sin \theta_d) = m^*\lambda, (m=0, \pm 1, \pm 2, \ldots),$$

where n is the valid refractive index in the guided mode of the waveguide layer, $\theta_i$ is the incidence angle, $\theta_d$ is the refraction angle, i.e., the angle between the direction of the light coupled out of the waveguide layer, and the normal to the surface of the waveguide layer, and m is the refraction order.

In a particular implementation, there is a fixed light exiting direction at some position in the light source assembly above according to the embodiment of this disclosure, that is, the light exiting direction, i.e., the angle $\theta_d$ in the equation above, is fixed, in some particular application scenario, so the grating periodicity Λ of the grating coupling structure 05 can be adjusted to thereby select beams in a given color (at the light wavelength λ) to exit in a given direction (at the angle $\theta_d$ from the normal to the surface of the waveguide layer 03), that is, the grating periodicity is determined by the desirable direction of the existing light, and color of the incident light.

In a particular implementation, in the light source assembly above according to the embodiment of this disclosure, the material of the waveguide layer includes at least one of resin, glass, ITO, or $Si_3N_4$, although the embodiment of this disclosure will not be limited thereto.

In a particular implementation, in the light source assembly above according to the embodiment of this disclosure, the material of the grating coupling structures is generally a transparent medium material, e.g., $SiO_2$, a resin material, etc.

In a particular implementation, in the light source assembly above according to the embodiment of this disclosure, the material of the grating coupling structure may or may not be the same as the material of the waveguide layer, although the embodiment of this disclosure will not be limited thereto.

Preferably, in the light source assembly above according to the embodiment of this disclosure, the grating coupling structure and the waveguide layer can be fabricated in an integral structure, although the embodiment of this disclosure will not be limited thereto.

Figure 4A:
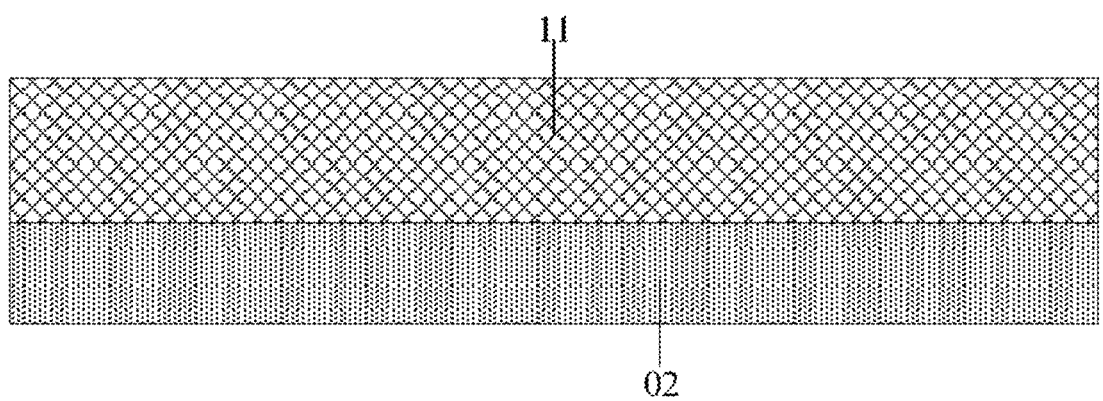
FIG. 4a and FIG. 4b are schematic structural diagrams respectively of sections after respective steps in a method for manufacturing an integral structure according to a particular embodiment.
Figure 4B:
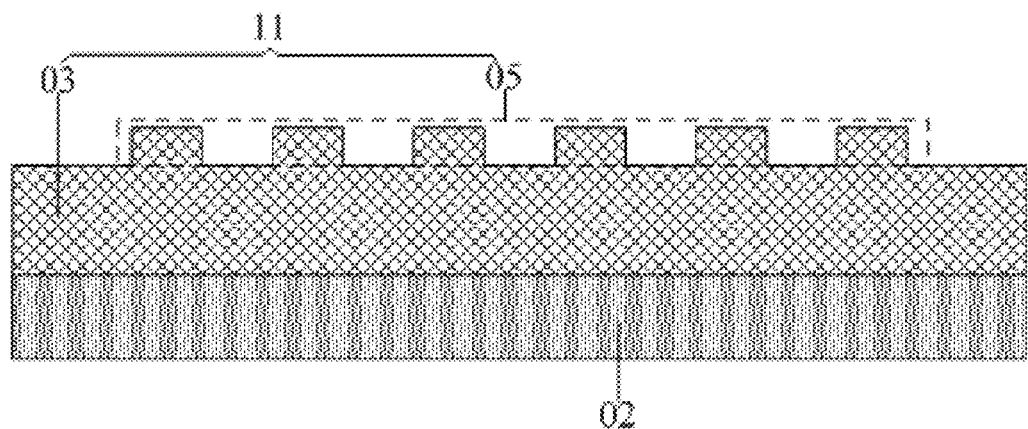
Figure 5A:
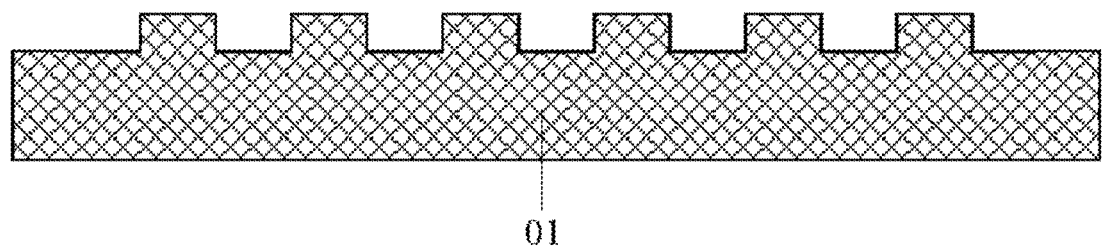
FIG. 5a and FIG. 5b are schematic structural diagrams respectively of sections after respective steps in another method for manufacturing an integral structure according to a particular embodiment.
Figure 5B:
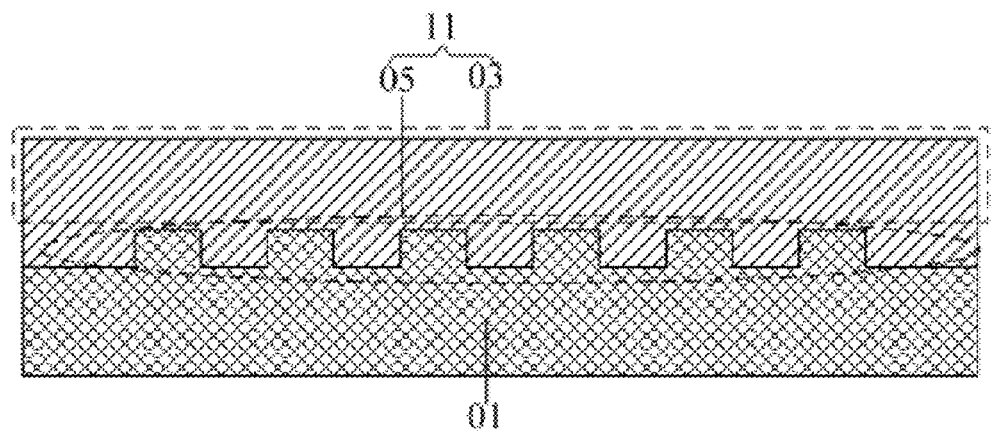
Figure 6:
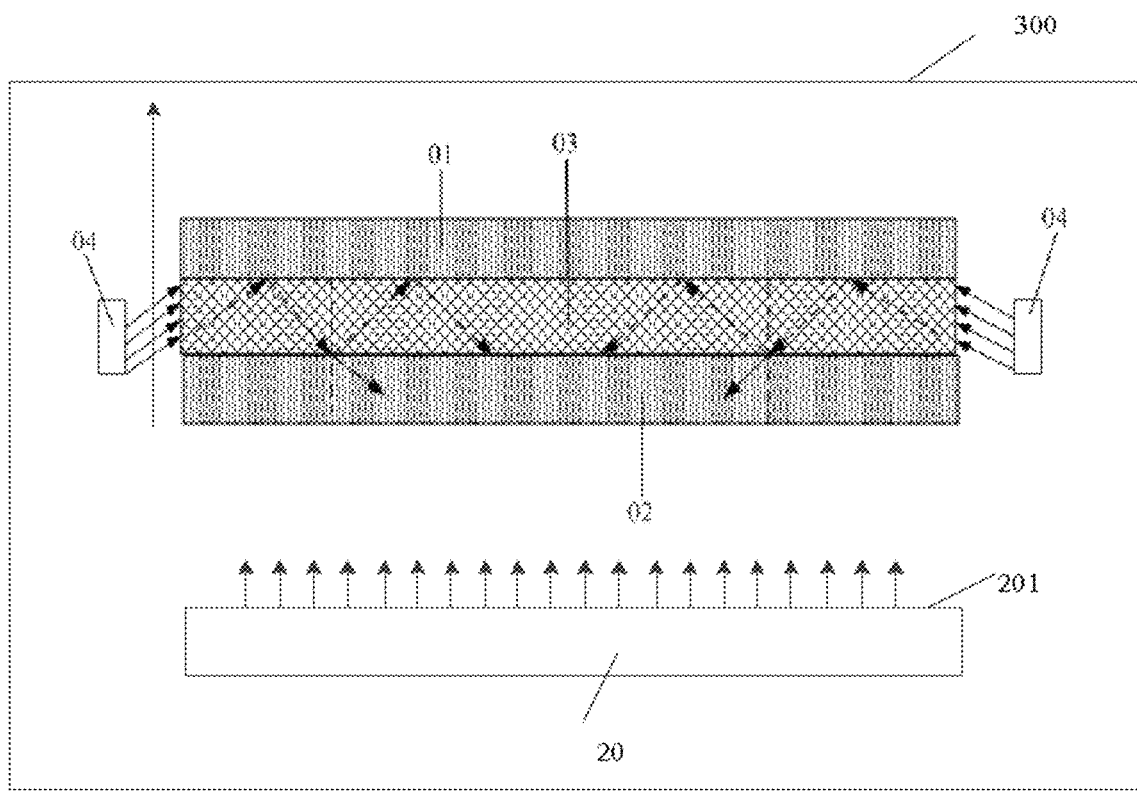
FIG. 6 is a schematic structural diagram of a display device according to an embodiment of this disclosure.

A method for fabricating the grating coupling structure and the waveguide layer in an integral structure according to the embodiment of this disclosure will be described below. Particularly the method can include the following steps:

(1) a waveguide film layer 11 is formed on the second substrate 02 as illustrated in FIG. 4a; and (2) the surface of the waver guider layer 11 is patterned into a plurality of uniform grooves as illustrated in FIG. 4b, that is, the grating coupling structure and the waveguide layer 03 are formed in an integral structure;

alternatively (1) the lower surface of the first substrate 01 is patterned into a plurality of uniform grooves as illustrated in FIG. 5a; and (2) a waveguide film layer 11 is formed on the lower surface of the first substrate 01 as illustrated in FIG. 5b, that is, the grating coupling structure and the waveguide layer 03 are formed in an integral structure.

It shall be noted that in the method above for fabricating the integral structure according to the embodiment of the invention, the patterning process may include only a photolithography process, or may include a photolithography process and an etching step, and also may include nanometer imprinting, UV exposure, electron beam exposure, and other processes for forming a predetermined pattern; and the photolithography process refers to a process of forming a pattern using photoresist, a mask, an exposure machine, etc., in film formation, exposure, development, and other process steps. In a particular implementation, a corresponding patterning process can be selected for the structure formed in the embodiment of this disclosure.

In a particular implementation, in the light source assembly above according to the embodiment of this disclosure, the thickness of the waveguide layer is generally controlled between 100 nm to 100 µm, and when the side-incident collimated light source is highly collimated, or the mode coupled into the waveguide layer can be controlled in effect, the thickness of the waveguide layer can be increased as appropriate to thereby improve the efficiency of light incidence, for example, between 500 nm to 100 µm; or when the side-incident collimated light source is less collimated, the thickness of the waveguide layer needs to be small enough to facilitate the control of the grating coupling structure on the direction and the color of the exiting light, and preferably there is a single mode waveguide; and for example, the thickness of the waveguide layer is 100 nm, although the embodiment of this disclosure will not be limited thereto.

In a particular implementation, in the light source assembly above according to the embodiment of this disclosure, in order to enable the light exiting from the single side thereof, the grating periodicity of the grating coupling structure is generally more than 1000 nm, and the duty ratio thereof ranges from 0.1 to 0.9, which is the ratio of the width of a grating bar to the width of a grating gap.

In a particular implementation, in the light source assembly above according to the embodiment of this disclosure, there is a better effect for a duty ratio of 0.5 of the grating coupling structure, and of course, the duty ratio may deviate from this value in a real product design taking into account the desirable intensity of the exiting light, a need to balance a difference in brightness across different positions on the display panel, a process condition, and other factors.

In a particular implementation, in the light source assembly above according to the embodiment of this disclosure, the thickness of the grating coupling structures is generally controlled between 100 nm to 1.5 µm, although the embodiment of this disclosure will not be limited thereto.

Preferably in the light source assembly above according to the embodiment of this disclosure, the thickness of the grating coupling structures is preset at approximately 500 nm taking into account the sensitivity of the thickness of the grating coupling structure to a loss of energy of the light, coupled by the waveguide gratings, exiting from the single side of the light source assembly.

Particularly in order to enable the grating coupling structure to be fabricated through etching, the thickness of the grating coupling structures is generally required to be no more than the width of a grating bar in a particular implementation, although the embodiment of this disclosure will not be limited thereto.

Preferably in a particular implementation, in the light source assembly above according to the embodiment of this disclosure, there is the same thickness of all the grating bars in the grating coupling structure, which is the thickness of the grating coupling structure, and there is the same width of all the grating bars in the grating coupling structure.

In a particular implementation, in the light source assembly above according to the embodiment of this disclosure, as illustrated in FIG. 2, for example, both the first substrate 01 and the second substrate 02 are made of glass with a refractive index of 1.52, and the waveguide layer 03 is made of glass with a refractive index of 2.0; and at this time, when light from the side-incident collimated light source 04 is incident onto the waveguide layer 03 at an angle more than the critical angle, since there is the same refractive index of the first substrate 01 and the second substrate 02, there is a waveguide mode, that is, the incident light is totally reflected at both the boundary of the first substrate 01, and the boundary of the second substrate 02. However, when the grating coupling structure 05 is arranged between the waveguide layer 03 and the first substrate 01, the waveguide mode at the interface of the first substrate 01 is broken, that is, the grating coupling structure 05 is arranged so that there is a different condition for total reflection at the interface between the waveguide layer 03 and the first substrate 01 from a condition for total reflection at the interface between the waveguide layer 03 and the second substrate 02, so when the light from the side-incident collimated light source 04 is incident onto the waveguide layer 03 at a preset incident angle, the incident light is totally reflected at the interface between the waveguide layer 03 and the first substrate 01, and refracted at the interface between the waveguide layer 03 and the second substrate 02, and in this way, the light can exit the single side of the light source assembly.

In a particular implementation, in the light source assembly above according to the embodiment of this disclosure, an Maxwell equation can be solved in the time and frequency domains using the time-domain definite differential software FDTD Solutions to thereby optimize geometrical parameters of the grating coupling structure, and the refractive indexes of the materials of the respective components so as to improve the contrast of the light exiting efficiency between the first substrate and the second substrate. For example, when the waveguide layer and the grating coupling structure are made of different materials, for example, the grating coupling structure is made of a transparent resin material or glass material with a refractive index of 1.56, and the waveguide layer is made of glass with a refractive index of 1.63, the ratio of the light exiting efficiency of the first substrate to the light exiting efficiency of the second substrate can be improved by one or two orders of magnitude.

Furthermore the periodicity and the thickness of the grating coupling structure, and the thickness of the waveguide layer need to be adjusted and optimized as required for the real efficiency of exiting light. Generally there is a higher contrast of the efficiency of exiting light given a smaller thickness of the grating coupling structure.

In the first embodiment of this disclosure, there is the same refractive index of the first substrate and the second substrate, and the grating coupling structure is arranged between the waveguide layer and the first substrate, or between the waveguide layer and the second substrate so that there is a different condition for total reflection at the interface between the waveguide layer and the first substrate from a condition for total reflection at the interface between the waveguide layer and the second substrate, and the light from the side-incident collimated light source is controlled to be incident onto the waveguide layer at a preset incidence angle, so that the light exits from the single side of the light source assembly. The periodicity, the thickness, and the duty ratio of the grating coupling structure can be adjusted for a higher ratio of the light exiting efficiency of the first substrate to the light exiting efficiency of the second substrate. However in the first embodiment above, the arrangement of the grating coupling structure may corrupt the structure of the upper surface of the waveguide layer, and since light may be leaked in the air medium, the condition of total reflection at the interface between the waveguide layer and the first substrate may be broken, so that a part of the light may exit more than the single side of the light source assembly, and the display contrast, brightness, color, etc., of the light source assembly may be affected due to the leakage of the light.

Second Embodiment

In a particular implementation, in the light source assembly above according to the embodiment of this disclosure, the refractive index of the second substrate 02 is higher than the refractive index of the first substrate 01 as illustrated in FIG. 1.

In a particular implementation, for example, the refractive index of the first substrate is n1, the refractive index of the second substrate 02 is n2, and the refractive index of the waveguide layer is n0; light from the side-incident collimated light source incident onto the waveguide layer has a critical angle θ1 of total reflection at the boundary of the first substrate, and a critical angle θ2 of total reflection at the boundary of the second substrate; and when the light of the side-incident collimated light source is incident onto the side of the waveguide layer at a preset angle θi (an incidence angle), there is a varying light path in the waveguide layer as θi varies. For example, (1) when the incidence angle satisfies θ1<θ2<θi<90°, the incident light is totally reflected at both the interface between the waveguide layer and the first substrate, and the interface between the waveguide layer and the second substrate; (2) when the incidence angle satisfies θ1<θi<θ2, the condition of total reflection at the interface between the waveguide layer and the second substrate is broken, so the light is radiated out of the second substrate; (3) when the incidence angle satisfies θ2<θi<θ1, the condition of total reflection at the interface between the waveguide layer and the first substrate is broken, so the light is radiated out of the first substrate; and (4) when the incidence angle satisfies θi<θ1<θ2, both the condition for total reflection at the interface between the waveguide layer and the first substrate is broken, and the condition for total reflection at the interface between the waveguide layer and the second substrate are broken, so the light is radiated out of the first and second substrates.

In the light source assembly above according to the embodiment of this disclosure, the principle (2) above is applied so that the incident light is totally reflected at the interface between the waveguide layer and the first substrate, and refracted at the interface between the waveguide layer and the second substrate, and in this way, the light is radiated at the boundary of the second substrate, that is, the light exits from the single side of the light source assembly. Alternatively the principle (3) above is applied so that the incident light is totally reflected at the interface between the waveguide layer and the second substrate, and refracted at the interface between the waveguide layer and the first substrate, and in this way, the light is radiated at the boundary of the first substrate, that is, the light also exits the single side of the light source assembly. Of course, alternatively the principle (4) above is applied so that the incident light is totally refracted at both the interface between the waveguide layer and the second substrate, and the interface between the waveguide layer and the first substrate, and in this way, the light is radiated out of both the first substrate and the second substrate, that is, the light can exit both the sides of the light source assembly.

The embodiment of this disclosure in which the light exits from the single side of the light source assembly under the principle (2) above will be described by way of an example. For example, if the light is to be radiated out of the second substrate, then the incident light will be totally reflected at the interface between the waveguide layer and the first substrate, where the incidence angle θi needs to satisfy:

$$\arcsin(n1/n0)=\theta 1<\theta i<\theta 2=\arcsin(n2/n0),$$

that is, the refractive index of the waveguide layer needs to satisfy n0>n2>n1.

Accordingly in the light source assembly above according to the embodiment of this disclosure, the thickness of the waveguide layer, and the difference Δn between the refractive index n0 of the waveguide layer, and the refractive index n2 of the second substrate can be adjusted to obtain the light source assembly with a varying efficiency of exiting light, that is, the light source assembly with a varying efficiency of exiting light can be created by selecting the thickness of the waveguide layer, and Δn as appropriate.

In the embodiment of this disclosure, for example, as illustrated in FIG. 1, the first substrate 01 is made of glass with the refractive index n1 of 1.46, the second substrate 02 is made of optical glass or a transparent resin material with the refractive index n2 of 1.52, and the waveguide layer 03 is made of glass with the refractive index n0 of 1.64; and when light from the side-incident collimated light source 04 on both the sides of the waveguide layer 03 is incident onto the waveguide layer at any angle between 64° to 69°, all the light can exit the from single side of the light source assembly, and the ratio of the efficiency of the light emitting at the interface of the second substrate 02 to the efficiency of the light emitting at the interface of the first substrate 01 is higher than $10^8$.

In a particular implementation, in the light source assembly above according to the embodiment of this disclosure, the first substrate can be made of some optical glass, transparent resin, or another material with a low refractive index, and the second substrate can be made of glass of a common LCD or OLED substrate, or can be made of some optical glass, transparent resin material, etc., although the embodiment of the invention will not be limited thereto.

Preferably in a particular implementation, in the light source assembly above according to the embodiment of this disclosure, the first substrate is made of optical glass with a refractive index of 1.46, and the second substrate is made of optical glass with a refractive index of 1.52.

In a particular implementation, in the light source assembly above according to the embodiment of this disclosure, the thicknesses of the first substrate and the second substrate are determined by a particular product design or process condition, although the embodiment of the invention will not be limited thereto.

In a particular implementation, in the light source assembly above according to the embodiment of this disclosure, the thickness of the first substrate is 2 μm, and the thickness of the second substrate is 0.5 mm.

In a particular implementation, in order to enable the light to be radiated uniformly in effect out of the surface of the first substrate or the second substrate, in the light source assembly above according to the embodiment of this disclosure, there is good planarity of, and a high parallel extent between, the lower surface of the first substrate, and the upper surface of the second substrate, i.e., their surfaces in contact with the waveguide layer.

Accordingly in the second embodiment of this disclosure, the three materials with the different refractive index need to be arranged reasonably so that the light can exit from the single side of the light source assembly, but no grating coupling structure will be introduced, so that the surface of the waveguide layer will not be broken, and light from the side-incident collimated light source arranged on both the sides of the waveguide layer can be incident onto the waveguide layer at a preset angle, so the light will not exit from one of the sides of the light source assembly, but can exit from the other side thereof with the controllable efficiency. In this way, there will be a very contrast of the light exiting efficiency between the first substrate and the second substrate, and the light can exit in a large area.

In a particular implementation, the light source assembly above according to the embodiment of this disclosure can operate as either a front light source or a backlight source, although the embodiment of this disclosure will not be limited thereto.

Based upon the same idea of this disclosure, an embodiment of this disclosure further provides a display device including a display panel, and a front light source located at the light exiting side of the display panel, where the front light source is the light source assembly according to any one of the embodiments above of this disclosure, and the second substrate of the light source assembly is located on the side thereof proximate to the display panel. Since the display device addresses the problem under a similar principle to the light source assembly above, reference can be made to the implementation of the light source assembly above for an implementation of the display device, and a repeated description thereof will be omitted here.

In the light source assembly above according to the embodiment of this disclosure, the light of the side-incident collimated light source is totally reflected at the interface between the waveguide layer and the first substrate, and refracted at the interface between the waveguide layer and the second substrate, that is, the light is radiated out of the second substrate of the light source assembly, so that the light exits from the single side of the light source assembly, thus improving the light exiting efficiency of the light source assembly, so when the light source assembly according to the embodiment of this disclosure is configured as the front light source of the display panel, a display effect of the display panel can be improved.

Based upon the same idea of this disclosure, an embodiment of this disclosure further provides a display device 300 including a liquid crystal display panel 20, and a backlight source configured to provide a light source for the liquid crystal display panel 20, where the backlight source is the light source assembly according to any one of the embodiments above of this disclosure, and the second substrate 02 of the light source assembly is located on the side 201 thereof proximate to the liquid crystal display panel. Since the display device addresses the problem under a similar principle to the light source assembly above, reference can be made to the implementation of the light source assembly above for an implementation of the display device, and a repeated description thereof will be omitted here.

In the light source assembly above according to the embodiment of this disclosure, the light of the side-incident collimated light source is totally reflected at the interface between the waveguide layer and the first substrate, and refracted at the interface between the waveguide layer and the second substrate, that is, the light is radiated out of the second substrate of the light source assembly, so that the light exits from the single side of the light source assembly, thus improving the light exiting efficiency of the light source assembly. Since the liquid crystal display panel is a passive panel, the backlight source is needed to have the light transmitted through the display panel. So when the light source assembly according to the embodiment of this disclosure is configured as the backlight source of the liquid crystal display panel, a display effect of the liquid crystal display panel can be improved because all the light exits from the single side of the light source assembly.

In the light source assembly and the display device above according to the embodiments of this disclosure, the light source assembly includes: a first substrate and a second substrate arranged opposite to each other; a waveguide layer arranged between the first substrate and the second substrate; and a side-incident collimated light source arranged on a side of the waveguide layer, where the refractive index of the waveguide layer is higher than the refractive index of the first substrate, and the refractive index of the second substrate respectively; and light of the side-incident collimated light source is incident onto the side of the waveguide layer at a preset angle, and the incident light is totally reflected at the interference between the first substrate and the waveguide layer. In the embodiments of this disclosure, the light of the side-incident collimated light source is reflected totally at the interface between the waveguide layer and the first substrate under the principle of total reflection, and refracted at the interface between the waveguide layer and the second substrate, that is, the light is radiated from the surface of the second substrate, thus improving the efficiency of the light exiting the single side of the light source assembly.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A light source assembly, comprising: a first substrate and a second substrate arranged opposite to each other; a waveguide layer arranged between the first substrate and the second substrate; and a side-incident collimated light source arranged on a side of the waveguide layer, wherein:
   a refractive index of the waveguide layer is higher than a refractive index of the first substrate, and a refractive index of the second substrate respectively; and
   light of the side-incident collimated light source is incident onto a side of the waveguide layer at a preset angle, wherein the incident light is totally reflected only at an interface between the first substrate and the waveguide layer;

wherein the refractive index of the first substrate is equal to the refractive index of the second substrate, and the light source assembly further comprises a grating coupling structure arranged between the waveguide layer and the first substrate, wherein:

the grating coupling structure comprises a plurality of grating bars arranged at an interval, and grating gaps between adjacent two of the grating bars, wherein a refractive index of a grating bar is higher than the refractive index of the first substrate, and wherein the incident light is refracted out of the waveguide layer from an interface between the second substrate and the waveguide layer;

the first substrate overlies the grating gaps; and a width of each of the plurality of grating bars is the same, a thickness of each of the plurality of grating bars is the same, and the thickness of each of the plurality of grating bars is no more than the width of each of the plurality of the grating bars.

2. The light source assembly according to claim 1, wherein a material of the grating coupling structure is the same as that of the waveguide layer.

3. The light source assembly according to claim 2, wherein the grating coupling structure and the waveguide layer are formed in an integral structure.

4. The light source assembly according to claim 1, wherein a grating periodicity of the grating coupling structure is more than 1000 nm, and a duty ratio of the grating coupling structure ranges from 0.1 to 0.9.

5. The light source assembly according to claim 1, wherein a thickness of the grating coupling structure ranges from 100 nm to 1.5 μm.

6. The light source assembly according to claim 1, wherein a material of the waveguide layer comprises at least one of resin, glass, ITO, or $Si_3N_4$.

7. The light source assembly according to claim 1, wherein a thickness of the waveguide layer ranges from 100 nm to 100 μm.

8. The light source assembly according to claim 1, wherein light from the collimated light source is light into which monochromatic light emitted from at least three types of monochromatic laser chips is mixed; or the light from the collimated light source is light into which monochromatic light emitted from at least three types of monochromatic light-emitting diode chips is mixed after a collimating structure; or the light from the collimated light source is white light, emitted by a white light-emitting diode chip, which is collimated by a collimating structure; or the light from the collimated light source is light emitted by a cold cathode fluorescent lamp bar and collimated by a collimating structure.

9. A display device, comprising a display panel, and a front light source located at a light exiting side of the display panel, wherein the front light source is the light source assembly according to claim 1; and the second substrate of the light source assembly is located on a side thereof proximate to the display panel.

10. A display device, comprising a liquid crystal display panel, and a backlight source configured to provide a light source for the liquid crystal display panel, wherein the backlight source is the light source assembly according to claim 1; and the second substrate of the light source assembly is located on a side thereof proximate to the liquid crystal display panel.

11. A light source assembly, comprising: a first substrate and a second substrate arranged opposite to each other; a waveguide layer arranged between the first substrate and the second substrate; and a side-incident collimated light source arranged on a side of the waveguide layer, wherein:

a refractive index of the waveguide layer is higher than a refractive index of the first substrate, and a refractive index of the second substrate respectively; and light of the side-incident collimated light source is incident onto a side of the waveguide layer at a preset angle, wherein the incident light is totally reflected only at an interface between the first substrate and the waveguide layer;

wherein the refractive index of the first substrate is equal to the refractive index of the second substrate, and the light source assembly further comprises a grating coupling structure arranged between the waveguide layer and the first substrate, wherein:

the grating coupling structure comprises a plurality of grating bars arranged at an interval, and grating gaps between adjacent two of the grating bars, wherein a refractive index of a grating bar is higher than the refractive index of the first substrate, and wherein the incident light is refracted out of the waveguide layer from an interface between the second substrate and the waveguide layer;

the first substrate overlies the grating gaps;

a width of each of the plurality of grating bars is the same, a thickness of each of the plurality of grating bars is the same, and the thickness of each of the plurality of grating bars is no more than the width of each of the plurality of the grating bars;

a thickness of the grating coupling structure ranges from 100 nm to 1.5 μm;

a thickness of the waveguide layer ranges from 100 nm to 100 μm; and light from the collimated light source is light into which monochromatic light emitted from at least three types of monochromatic laser chips is mixed; or the light from the collimated light source is light into which monochromatic light emitted from at least three types of monochromatic light-emitting diode chips is mixed after a collimating structure; or the light from the collimated light source is white light, emitted by a white light-emitting diode chip, which is collimated by a collimating structure; or the light from the collimated light source is light emitted by a cold cathode fluorescent lamp bar and collimated by a collimating structure.

12. The light source assembly according to claim 11, wherein a material of the grating coupling structure is the same as that of the waveguide layer.

13. The light source assembly according to claim 12, wherein the grating coupling structure and the waveguide layer are formed in an integral structure.

14. The light source assembly according to claim 11, wherein a grating periodicity of the grating coupling structure is more than 1000 nm, and a duty ratio of the grating coupling structure ranges from 0.1 to 0.9.

15. The light source assembly according to claim 11, wherein a material of the waveguide layer comprises at least one of resin, glass, ITO, or $Si_3N_4$.

16. A display device, comprising a display panel, and a front light source located at a light exiting side of the display panel, wherein the front light source is the light source assembly according to claim 11; and the second substrate of the light source assembly is located on a side thereof proximate to the display panel.

17. A display device, comprising a liquid crystal display panel, and a backlight source configured to provide a light source for the liquid crystal display panel, wherein the backlight source is the light source assembly according to claim 11; and the second substrate of the light source assembly is located on a side thereof proximate to the liquid crystal display panel.

* * * * *